(12) United States Patent
Chang et al.

(10) Patent No.: US 10,615,914 B2
(45) Date of Patent: Apr. 7, 2020

(54) DATA TRANSMISSION PARITY DEVICE AND METHOD

(71) Applicant: HONGFUJIN PRECISION ELECTRONICS (TIANJIN) CO., LTD., Tianjin (CN)

(72) Inventors: Yi-Ming Chang, New Taipei (TW); Hung-Pin Cheng, New Taipei (TW)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 16/046,267

(22) Filed: Jul. 26, 2018

(65) Prior Publication Data

US 2019/0393984 A1 Dec. 26, 2019

(30) Foreign Application Priority Data

Jun. 20, 2018 (CN) .......................... 2018 1 0639202

(51) Int. Cl.
*G06F 11/00* (2006.01)
*H03M 13/00* (2006.01)
*H04L 1/00* (2006.01)

(52) U.S. Cl.
CPC ................................. *H04L 1/0063* (2013.01)

(58) Field of Classification Search
CPC ...................................................... H04L 1/0063
See application file for complete search history.

(56) References Cited

U.S. PATENT DOCUMENTS

| | | | | |
|---|---|---|---|---|
| 5,838,363 A | * | 11/1998 | Saito | H04N 1/00236 348/96 |
| 2008/0022193 A1 | * | 1/2008 | Maciver | G06F 11/2007 714/800 |
| 2011/0225475 A1 | * | 9/2011 | Kumar | G06F 11/1052 714/763 |

* cited by examiner

*Primary Examiner* — Samir W Rizk
(74) *Attorney, Agent, or Firm* — ScienBiziP, P.C.

(57) ABSTRACT

A data transmission parity device for verifying data transmitted from a first device through a data line to a second device includes a processor and a memory. The data line includes an N number of signal pins for transmitting data and an (N+1)th signal pin for transmitting parity information. The processor is configured to receive and obtain a signal value of the N+1 signal pins, calculate a first sum of the signal value of the N+1 signal pins and apply a first modular operation on the first sum, determine whether a result of the first modular operation is equal to zero, and control the second device to reject the data when the result of the first modular operation is not equal to zero. The first modular operation and the second modular operation are both (mod 2) operations.

10 Claims, 4 Drawing Sheets

DATA TRANSMISSION PARITY DEVICE
AND METHOD

FIELD

The subject matter herein generally relates to data transmission, and more particularly to a data transmission parity device and a method for verifying data transmitted from a first electronic device to a second electronic device.

BACKGROUND

Generally, data transmitted from one device to another device is verified by verifying a parity bit in the data. Verification of the parity bit sometimes is erroneous.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
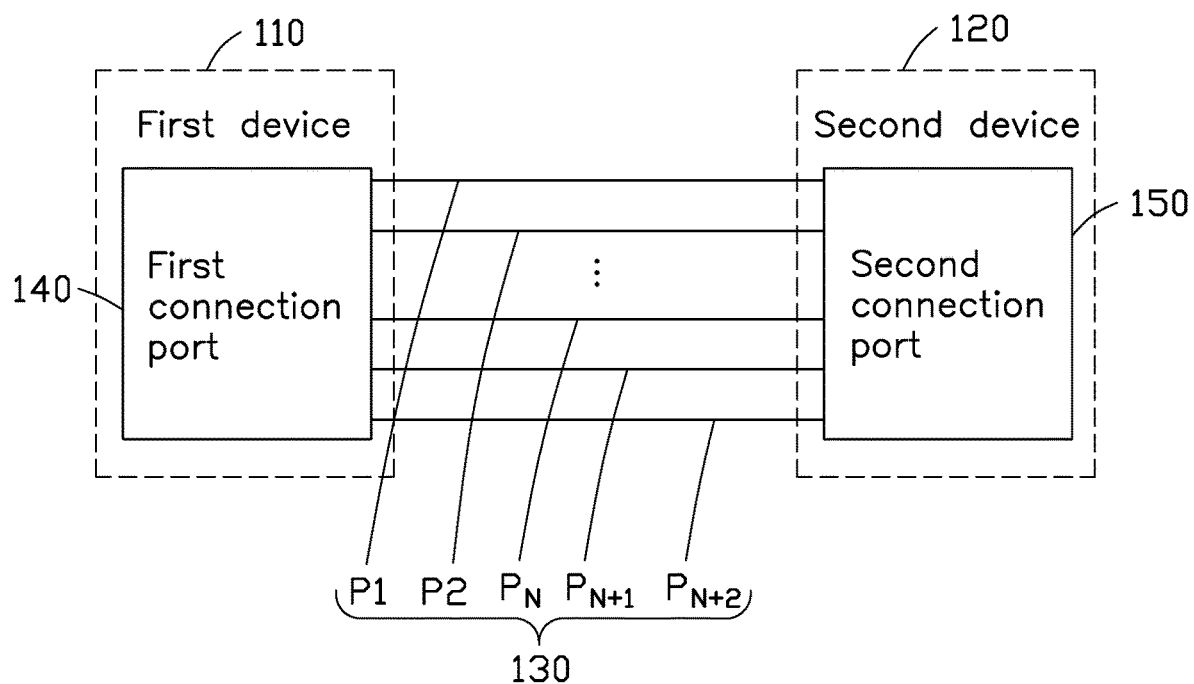
FIG. 1 is a block diagram of a first device coupled to a second device by a data line in accordance with an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 2:
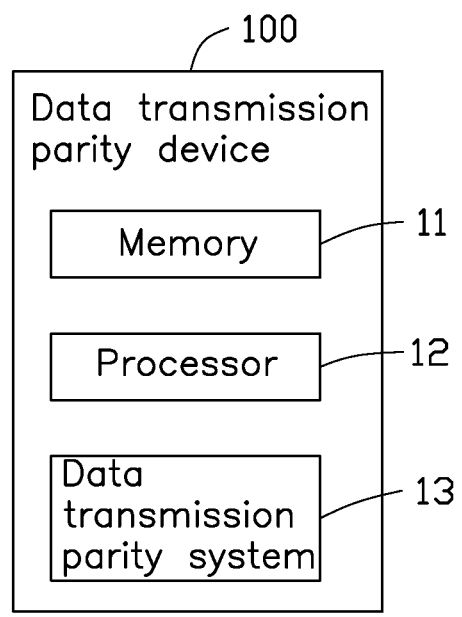
FIG. 2 is a block diagram of a data transmission parity device.
Figure 3:
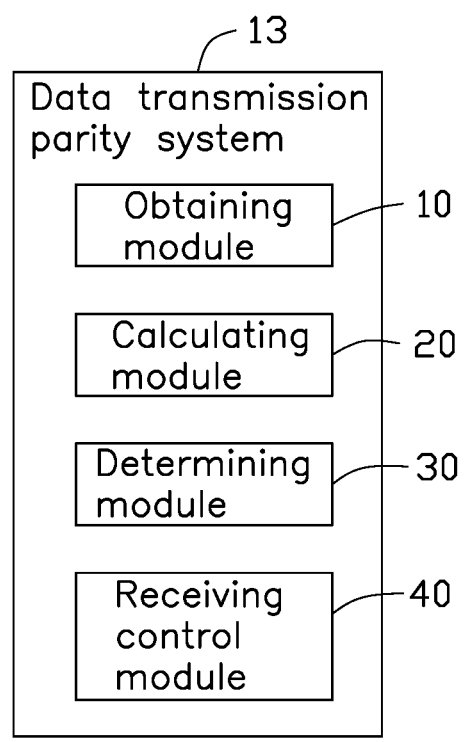
FIG. 3 is a block diagram of a data transmission parity system implemented in the data transmission parity device.

FIGS. 1-3 illustrate an embodiment of a data transmission parity device 100 (hereinafter "the device 100") for verifying data transmitted from a first device 110 to a second device 120. The first device 110 transmits the data to the second device 120 through a data line 130. The data line 130 includes an "n" number of signal pins P1-Pn.

For example, the first device 110 may be a rack management device, and the second device 120 may be a server. The first device 110 includes a first connection port 140. The second device 120 includes a second connection port 150. One end of the data line 130 is coupled to the first connection port 140, and the other end of the data line is coupled to the second connection port 150 to enable transmission of data from the first device 110 to the second device 120.

In at least one embodiment, the device 100 is installed within the second device 120 or is a standalone device for verifying data transmitted from the first device 110 to the second device 120. The data line 130 further includes an N+1)th signal pin Pn+1 for transmitting parity information. In another embodiment, the device 100 is installed in the first device 110.

The device 110 includes a memory 11, a processor 12, and a data transmission parity system 13. The data transmission parity system 13 may be divided into a plurality of modules stored in the memory 11 and executed by the processor 12 for implementing functions of the data transmission parity system 13. Referring to FIG. 3, the plurality of modules of the data transmission parity system 13 may include an obtaining module 10, a calculating module 20, a determining module 30, and a receiving module 40.

In at least one embodiment, the memory 11 may include at least one of a read-only memory, a random access memory, a programmable read-only memory, an erasable programmable read-only memory, a one-time programmable read-only memory, an electrically-erasable programmable read-only memory, an electrically-erasable programmable read-only memory, a compact disc read-only memory, or other optical storage disk, magnetic storage disc, or magnetic storage tape. The processor 12 can be a central processing unit, a microprocessing unit, or other data processing chips.

The obtaining module 10 receives and obtains signal values of the N+1 signal pins.

In at least one embodiment, the signal value is a binary number. The signal value of each signal pin is represented by logic 1 or logic 0. The (N+1)th signal pin Pn+1 is a parity bit. The signal value of the (N+1)th signal pin Pn+1 is set according to requirements. The signal value of the (N+1)th signal pin Pn+1 can be set as logic 1 or logic 0.

The calculating module 20 calculates a first sum of the signal values of the N+1 signal pins and applies a first modular operation on the first sum.

In at least one embodiment, the first modular operation is a modular 2 operation. For example, if a signal of the N+1 signal pins P1-Pn+1 is "1111101" and the sum of the signal values is represented by 1+1+1+1+1+0+1=6, then a result of the calculating module 20 applying the first modular operation on the first sum is represented by (1+1+1+1+1+0+1) (mod 2)=0. If a signal of the N+1 signal pins P1-Pn+1 is "1111111" and the first sum of the signal values is represented by 1+1+1+1+1+1+1=6, then a result of the calculating module 20 applying the first modular operation on the first sum is represented by $(1+1+1+1+1+1)(\bmod 2)=1$.

The determining module 30 determines whether the result of the first modular operation is equal to 0.

The receiving control module 40 controls the second device 120 to reject the data transmitted from the first device 110 when the result of the first modular operation is not equal to 0.

For example, if the data transmitted by the first device 110 through the N+1 signal pins P1-Pn+1 is "111111", the parity bit (the (N+1)th signal pin Pn+1) is "1", and the data received by the second device 120 is "111011", then the result of the first modular operation is represented by $(1+1+1+0+1+1)(\bmod 2)=1$. Since the result of the first modular operation is not equal to 0, the receiving control module 40 controls the second device 120 to reject the data "111011".

In at least one embodiment, the data line 130 further includes an (N+2)th signal pin Pn+2 for transmitting the parity information. A signal value of the (N+2)th signal pin Pn+2 can be set according to requirements. The signal value of the (N+2)th signal pin Pn+2 can be set as logic 1 or logic 0.

If the result of the first modular operation is equal to 0, the calculating module 20 multiplies a signal value of each even bit signal pin of the N+1 signal pins P1-Pn+1 by two, calculates a second sum of the signal value of the multiplied N+1 signal pins P1-Pn+1, and applies a second modular operation on the second sum. The determining module 30 determines whether a result of the second modular operation is equal to a signal value of the (N+2)th signal pin. The receiving control module 40 controls the second device 120 to accept the data when the result of the second modular operation is equal to the signal value of the (N+2)th signal pin. If the result of the second module operation is not equal to the signal value of the (N+2)th signal pin, the receiving control module 40 controls the second device 120 to reject the data. The second modular operation is a (mod 2) operation.

For example, if the first device 110 transmits the data "1111111" through the N+2 signal pins P1-Pn+2 and the data of the N signal pins P1-Pn is "11111", then the signal value of the (N+1)th signal pin Pn+1 is equal to 1, and the signal value of the (N+2)th signal pin Pn+2 is equal to 1. The device 100 detects the data received by the second device 120 as "1111111". The result of the first modular operation applied to the N+1 signal pins P1-Pn+1 is represented as $(1+1+1+1+1+1)(\bmod 2)=0$. Since the result of the first modular operation is equal to 0, a second parity is required. The signal values of the even bit signal pins of the N+1 signal pins P1-Pn+1 are multiplied by two. The second sum of the signal values of the multiplied N+1 signal pins P1-Pn+1 is represented by $1+1*2+1+1*2+1+1*2=9$, and the result of the second modular operation is represented by $(1+1*2+1+1*2+1+1*2)(\bmod 2)=1$. Since the result of the second modular operation is equal to the signal value of the N+2 signal pin Pn+2, the receiving control module 40 controls the second device 120 to accept the data "1111111".

If the first device 110 transmits the data "1111111" through the N+2 signal pins P1-Pn+2 and the data of the N signal pins P1-Pn is "11111", then the signal value of the (N+1)th signal pin Pn+1 is equal to 1, and the signal value of the (N+2)th signal pin Pn+2 is equal to 1. The device 100 detects the data received by the second device 120 as "0011110". The result of the first modular operation applied to the N+1 signal pins P1-Pn+1 is represented as $(0+0+1+1+1+1)(\bmod 2)=0$. Since the result of the first modular operation is equal to 0, a second parity is required. The signal values of the even bit signal pins of the N+1 signal pins P1-Pn+1 are multiplied by two. The second sum of the signal values of the multiplied N+1 signal pins P1-Pn+1 is represented by $0+0*2+1+1*2+1+1*2=6$, and the result of the second modular operation is represented by $(0+0*2+1+1*2+1+1*2)(\bmod 2)=0$. Since the result of the second modular operation is not equal to the signal value of the (N+2)th signal pin Pn+2, the receiving control module 40 controls the second device 120 to reject the data "0011110".

In at least one embodiment, the data line 130 is a CAT5 cable. The CAT5 cable includes eight data lines, two of which are used for transmitting parity information. N is less than or equal to 6.

Figure 4:
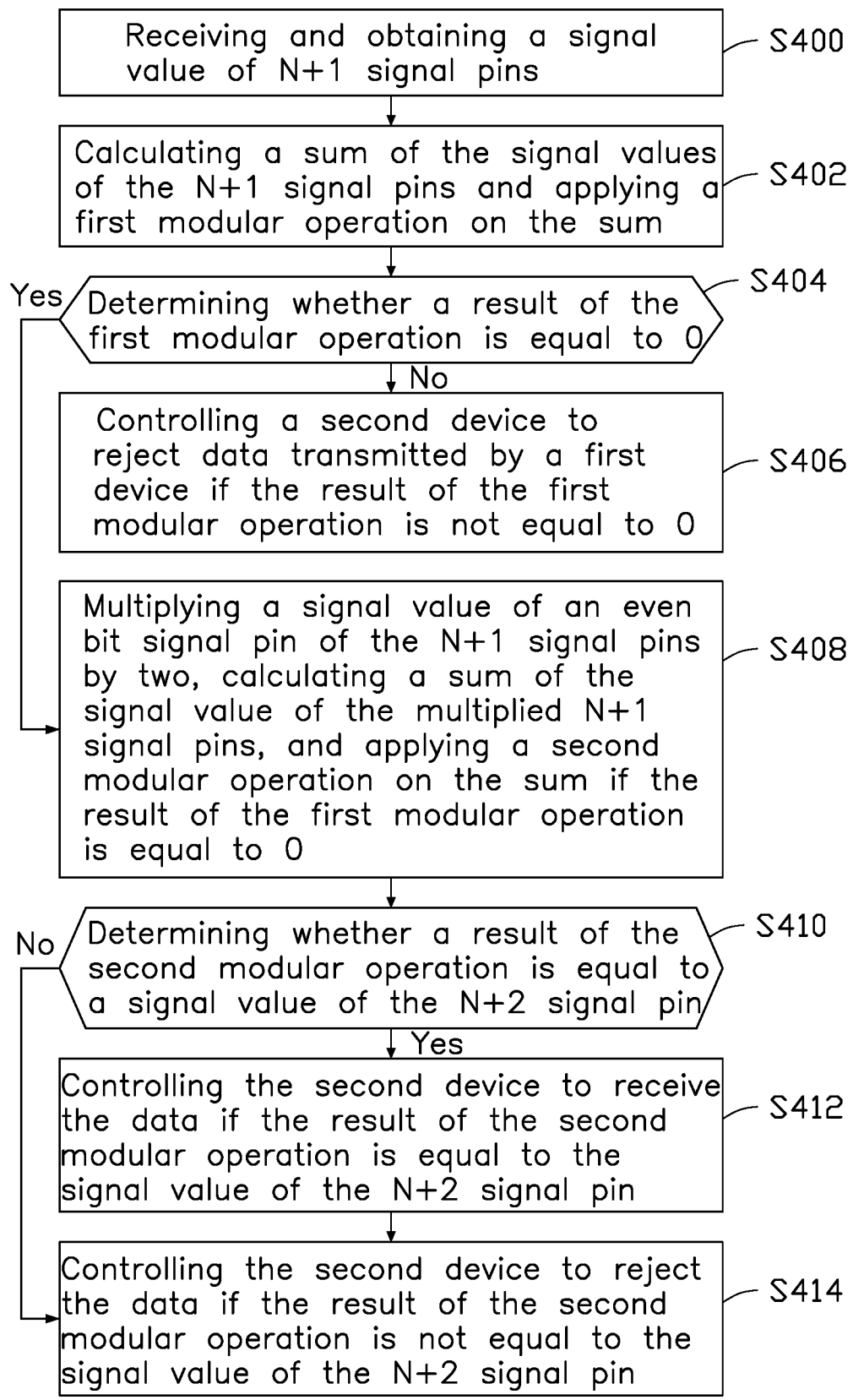
FIG. 4 is a flowchart of a data transmission parity method.

FIG. 4 illustrates a flowchart of an exemplary data transmission parity method for verifying data transmitted from a first device through a data line to a second device. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S400.

At block S400, the obtaining module 10 receives and obtains a signal value of the N+1 signal pins At block S402, the calculating module 20 calculates a first sum of the signal values of the N+1 signal pins and applies a first modular operation on the first sum.

At block S406, if the result of the first modular operation is not equal to 0, the receiving control module 40 controls the second device 120 to reject the data transmitted by the first device 110.

At block S408, if the result of the first modular operation is equal to 0, the calculating module 20 multiplies a signal value of each even bit signal pin of the N+1 signal pins by two, calculates a second sum of the signal value of the multiplied N+1 signal pins, and applies a second modular operation on the second sum.

At block S410, the determining module 30 determines whether a result of the second modular operation is equal to a signal value of the (N+2)th signal pin.

At block S412, if the result of the second modular operation is equal to the signal value of the (N+2)th signal pin, the receiving control module 40 controls the second device 120 to receive the data.

At block S414, if the result of the second modular operation is not equal to the signal value of the (N+2)th signal pin, the receiving control module 40 controls the second device 120 to reject the data.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A data transmission parity method for verifying data transmitted from a first device through a data line to a second device, the data line comprising an N number of signal pins for transmitting data, the data line further comprising an (N+1)th signal pin and an (N+2)th signal pin for transmitting parity information, the method comprising:
   receiving and obtaining signal values of the N+1 signal pins;
   calculating a first sum of the signal value of the N+1 signal pins and applying a first modular operation on the first sum;
   determining whether a result of the first modular operation is equal to zero;
   controlling the second device to reject the data when the result of the first modular operation is not equal to zero;
   multiplying a signal value of each even bit signal pin of the N+1 signal pins by two when the result of the first modular operation is equal to zero;
   calculating a second sum of the signal value of the multiplied N+1 signal pins and applying a second modular operation on the second sum;
   determining whether a result of the second modular operation is equal to a signal value of the (N+2)th signal pin; and
   controlling the second device to accept or reject the data according to an determined result between the second modular operation and the (N+2)th signal pin.

2. The data transmission parity method of claim 1, wherein the block of controlling the second device to accept or reject the data according to an determined result between the second modular operation and the (N+2)th signal pin comprises:
   controlling the second device to accept the data when the result of the second modular operation is equal to the signal value of the (N+2)th signal pin.

3. The data transmission parity method of claim 2, wherein the block of controlling the second device to accept or reject the data according to an determined result between the second modular operation and the (N+2)th signal pin further comprises:
   controlling the second device to reject the data when the result of the second modular operation is not equal to the signal value of the N+2 signal pin.

4. The data transmission parity method of claim 3, wherein the first modular operation and the second modular operation are both (mod 2) operations.

5. The data transmission parity method of claim 1, wherein the data line is a CAT5 cable, and N is less than or equal to six.

6. A data transmission parity device for verifying data transmitted from a first device through a data line to a second device, the data line comprising an N number of signal pins for transmitting data, the data line further comprising an N+1 signal pin and an (N+2)th signal pin for transmitting parity information, the data transmission parity device comprising:
   a processor; and
   a memory configured to store a plurality of instructions, which when executed by the processor, cause the processor to:
      receive and obtain a signal value of the N+1 signal pins;
      calculate a sum of the signal value of the N+1 signal pins and apply a first modular operation on the sum;
      determine whether a result of the first modular operation is equal to zero;
      control the second device to reject the data when the result of the first modular operation is not equal to zero;
      multiply a signal value of an even bit signal pin of the N+1 signal pins by two when the result of the first modular operation is equal to zero;
      calculate a sum of the signal value of the multiplied N+1 signal pins and apply a second modular operation on the sum;
      determine whether a result of the second modular operation is equal to a signal value of the N+2 signal pin; and
      control the second device to accept or reject the data according to an determined result between the second modular operation and the (N+2)th signal pin.

7. The data transmission parity device of claim 6, wherein the instruction of controlling the second device to accept or reject the data according to an determined result between the second modular operation and the (N+2)th signal pin comprises:
   controlling the second device to accept the data when the result of the second modular operation is equal to the signal value of the N+2 signal pin.

8. The data transmission parity device of claim 7, wherein the instruction of controlling the second device to accept or reject the data according to an determined result between the second modular operation and the (N+2)th signal pin further comprises:
   controlling the second device to reject the data when the result of the second modular operation is not equal to the signal value of the N+2 signal pin.

9. The data transmission parity device of claim 8, wherein the first modular operation and the second modular operation are both (mod–2) operations.

10. The data transmission parity device of claim 6, wherein the data line is a CAT5 cable, and N is less than or equal to six.

* * * * *